UNITED STATES PATENT OFFICE.

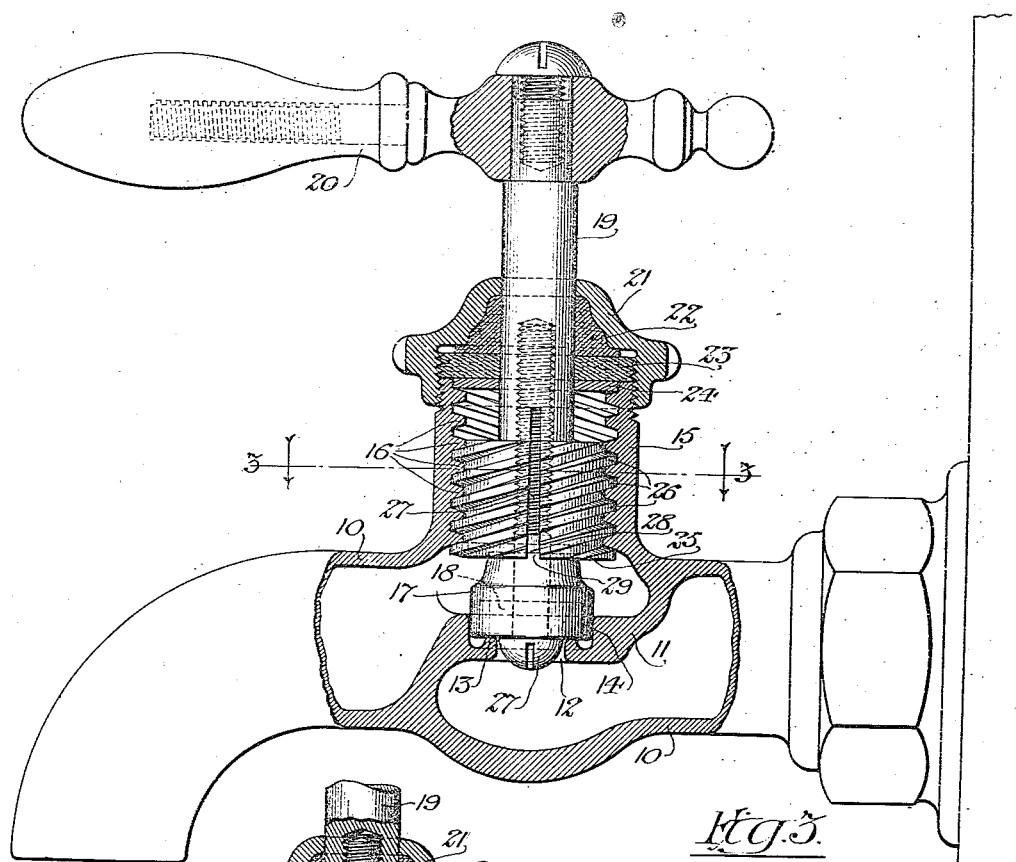

HARRY M. COOPER, OF OAK PARK, ILLINOIS, ASSIGNOR TO CHARLES WESTEN, OF CHICAGO, ILLINOIS.

VALVE.

1,122,480.      Specification of Letters Patent.      Patented Dec. 29, 1914.

Application filed March 30, 1914. Serial No. 828,301.

*To all whom it may concern:*

Be it known that I, HARRY M. COOPER, a citizen of the United States, and a resident of Oak Park, county of Cook, and State of Illinois, have invented certain new and useful Improvements in Valves, of which the following is a full, clear, and exact description.

The invention relates to valves for controlling the flow of water, steam or the like, and more particularly to valves of the quick opening type such as are used for water faucets.

Quick opening faucet valves are usually provided with a stem having double screw threads which engage coöperating threads of the valve casing, so that by turning the valve stem through a partial rotation, the valve can be quickly opened and closed. Such valves are mounted upon the discharge side of the valve seat, so that they open with the pressure. Such quick opening valves are convenient and easily manipulated, but on account of the sharp pitch of the screw threads, the pressure at times opens the valve and the tub or basin to which the faucet is applied is flooded. The present invention seeks to overcome this defect in quick opening valves by providing means for maintaining the threads of the valve stem and casing in snug engagement, so that there will be sufficient friction between these parts to prevent the pressure from opening the valve.

The invention consists in the features of improvement hereinafter set forth, illustrated in the preferred form in the accompanying drawings and more particularly pointed out in the appended claims.

Figure 1 is a view partially in elevation and partially in vertical section of the improved valve and showing the valve in closed position. Fig. 2 is a partial sectional view showing the valve stem rotated and the valve in open position. Fig. 3 is a detail cross-section on the line 3—3 of Fig. 1.

The valve casing 10 may be of any suitable form, that shown being adapted for use as a faucet. The casing 10 is provided with the usual partition 11 having a port 12 therethrough which is provided on its upper or discharge side with a valve seat 13. The partition is preferably provided with a recess 14 that surrounds the valve seat. Above the seat, the valve casing is provided with an upwardly projecting sleeve-like portion 15 which is provided with internal screw threads 16.

The valve shown is of usual form and comprises a metal disk 17 having a recess in its lower face within which is arranged a body 18 of suitable packing material which, in the closed position of the valve, engages the valve seat 13. A valve stem 19 is provided at its upper end with a suitable handle 20 and extends through a cap 21 which is threaded upon the upper end of the sleeve portion 15 of the valve casing. As usual, suitable packing material and washers 22, 23 and 24 are held in place by the cap 21 about the valve stem. The valve stem is provided with an enlarged lower end portion 25 which is provided with external screw threads 26 which coöperate with the screw threads 16 of the valve casing to open and close the valve. The enlarged lower end of the valve stem and the sleeve portion 15 are provided with double screw threads of sharp pitch, so that the valve is quickly opened and closed by turning the valve stem through a partial revolution. As stated, with such valves, it is difficult to form the sharp pitched screw threads so that they will fit snugly and with sufficient friction to prevent the pressure of the supply from opening the valve. To effect a snug engagement between the threads of the valve stem and casing, the enlarged lower end portion is split, as shown, and the screw threaded sections thereof are expanded and maintained in snug engagement with the screw threaded portion of the valve casing by means of a screw 27 which is threaded through a tapped bore extending axially through the lower portion of the valve stem. This screw also extends through the valve 17 and serves to hold it in position upon the lower end of the stem. Preferably, as shown, the upper portion of the valve 17 is somewhat reduced and the lower face of the valve stem is provided with a recess or seat into which the reduced upper end of the valve extends.

In forming the enlarged lower portion of the valve stem, it is first provided with the external screw threads 26 and with the tapped axial bore for receiving the screw 27. It is then split to divide the lower end into separate sections by means of a saw cut 29 extending in axial direction through this lower end portion, as clearly shown in Figs. 1 and 3. A very snug fit is provided between the threaded bore and the screw 27, and the latter slightly expands the lower split portion of the valve stem, so that the screw threaded sections are forced outwardly and maintained in snug engagement with the screw threads 16 of the valve casing. If desired, this wedging screw may be slightly conical.

With the improved construction, the valve is securely held to its seat even though the supply may be under considerable pressure. At the same time, the valve may be readily and quickly opened and closed.

It is obvious that changes may be made in the details set forth without departure from the essentials of the invention.

I claim as my invention:—

1. A valve comprising a casing having a valve seat and a threaded portion, a valve coöperating with said seat, a rotatable valve stem having a split threaded portion coöperating with the threaded portion of said casing to open and close the valve, and means for maintaining said threaded portions in snug engagement.

2. A valve comprising a casing having a seat and a threaded portion, a valve coöperating with said seat, a rotatable valve stem having threaded sections, and means for maintaining the threaded sections of said valve stem in snug engagement with the threaded portion of said valve casing.

3. A valve comprising a casing having a seat, a valve on the discharge side of said seat, a valve stem, said stem and casing having coöperating screw threads and the threaded portion of said stem being split and provided with a bore, and a wedging device extending within the bore of said stem for maintaining said screw threads in snug engagement.

4. A valve comprising a casing having a valve seat, a valve on the discharge side of said seat, and a valve stem, said stem and said valve casing having coöperating multiple screw threads for effecting the quick opening and closing movements of said valve, and the threaded portion of said stem being split, whereby the same can be expanded into snug engagement with the threaded portion of said casing.

5. A valve casing having a valve seat and an internally threaded sleeve, a rotatable valve stem extending through said sleeve and provided with an enlarged, split inner end provided with coöperating screw threads and with a bore, a valve, and a screw bolt extending through said valve and into the bore between the sections of the split lower end portion of said valve stem.

HARRY M. COOPER.

Witnesses:
GEORGE F. FISHER,
J. G. ANDERSON.